April 8, 1958 M. DZAMA 2,829,388
METHOD AND APPARATUS FOR MAKING NAILS FROM WIRE
STOCK DURING CONTINUOUS ADVANCE
OF SAID WIRE STOCK
Filed Aug. 21, 1953 5 Sheets-Sheet 1

INVENTOR.
MICHAEL DZAMA
BY
Woodling and Krost
Attys.

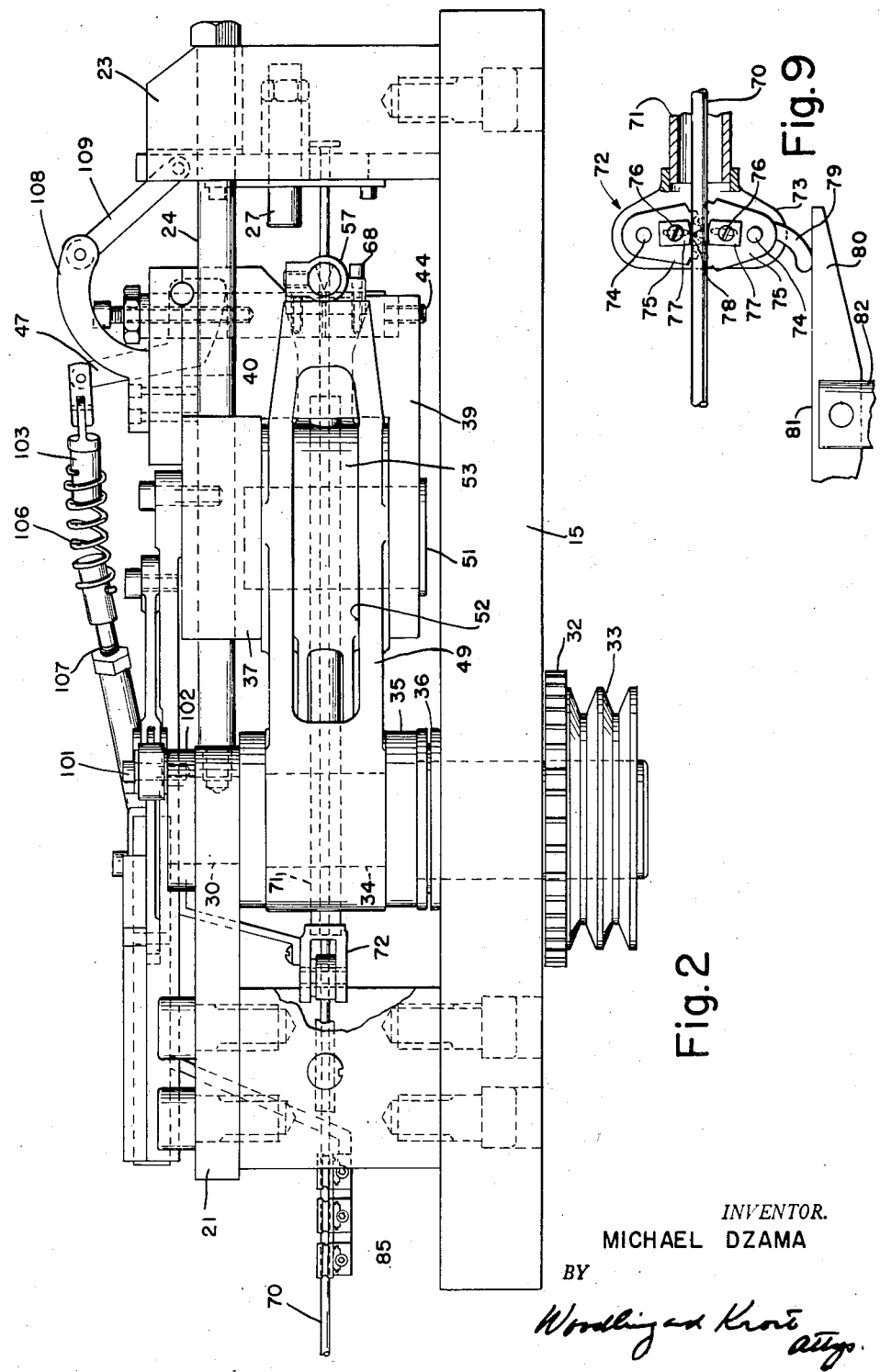

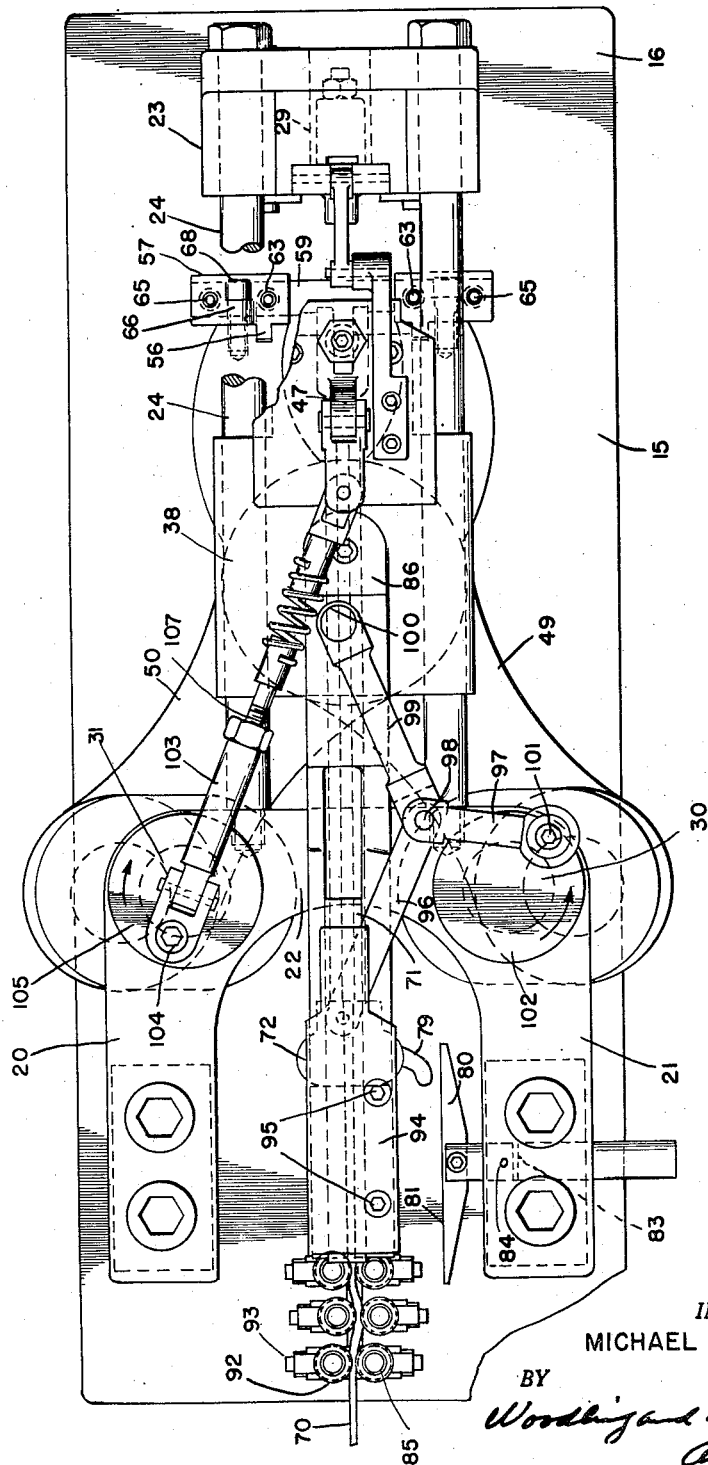

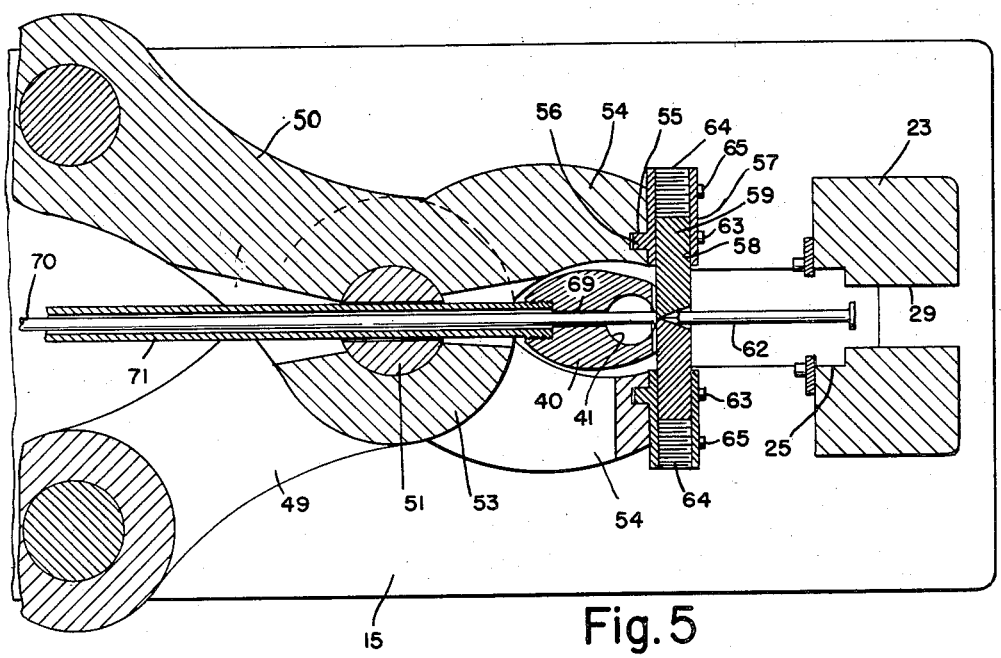
Fig. 5
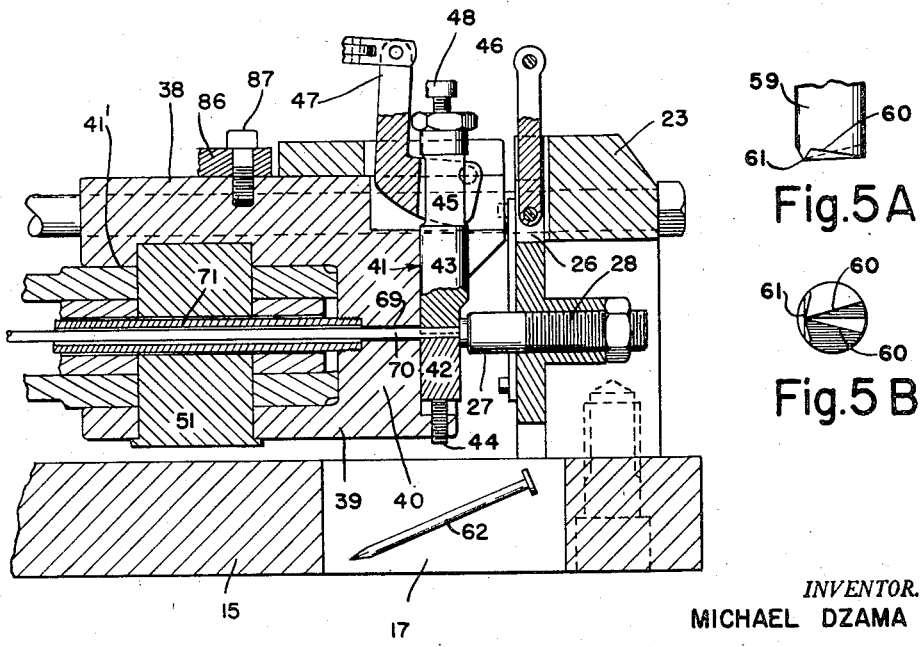
Fig. 4
Fig. 5A
Fig. 5B
INVENTOR.
MICHAEL DZAMA
BY

April 8, 1958 M. DZAMA 2,829,388
METHOD AND APPARATUS FOR MAKING NAILS FROM WIRE
STOCK DURING CONTINUOUS ADVANCE
OF SAID WIRE STOCK
Filed Aug. 21, 1953 5 Sheets-Sheet 5
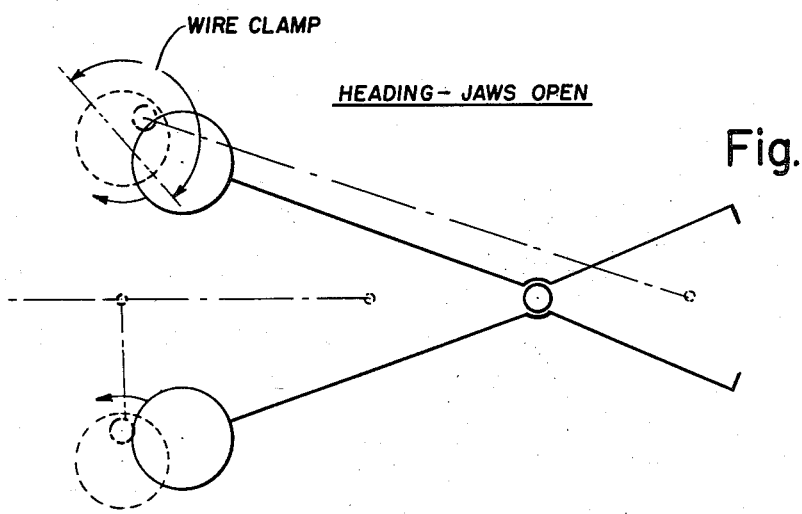
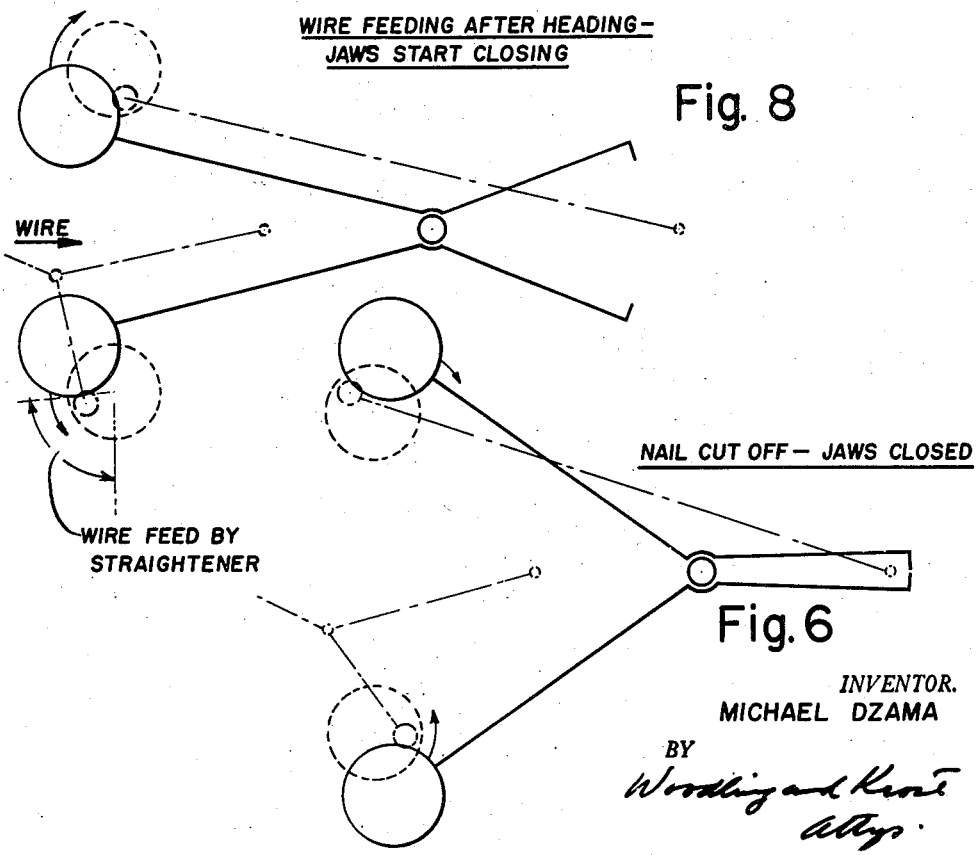
INVENTOR.
MICHAEL DZAMA
BY United States Patent Office 2,829,388
Patented Apr. 8, 1958

2,829,388

METHOD AND APPARATUS FOR MAKING NAILS FROM WIRE STOCK DURING CONTINUOUS ADVANCE OF SAID WIRE STOCK

Michael Dzama, Maple Heights, Ohio

Application August 21, 1953, Serial No. 375,744

19 Claims. (Cl. 10—54)

This invention relates to new and useful improvements in methods and apparatus for making nails.

An important object of the invention is to provide method and apparatus whereby the wire from which the nails are made is in motion constantly while a nail is in the process of being made.

Another important object is to provide a cooperative action between the header advancing the wire and wire feeding by a wire straightener, whereby the forward movement of the wire is substantially continuous during operation of the machine in order that the time cycle for forming a nail is greatly reduced for increased productivity.

Another object is to provide for wire straightening and nail length feeding during part of the retractile movement of the header with a timed clamping and release of clamping of the wire.

A further object is to provide a novel drive for not only reciprocating the header, but for also cyclically operating the nail cut-off means during advance of the header with the wire in motion therewith.

A still further object is to provide a novel drive mechanism for the machine including a pair of drive shafts from which all parts of the machine are operated for accurate cyclic timing, increased productivity, and indefinite life of the operating parts.

Still another object is to provide simple means for adjusting the machine for the production of different length nails, ease of replacement or repair of cut-off dies, adjustability of wire clamping pressures, and the adjustability of the timing thereof.

Other objects and advantages of the invention will become apparent during the course of the following description.

In the accompanying drawings forming a part of the description and wherein like numerals are employed to designate like parts throughout the several views:

Figure 2 is a side elevation of the machine with the parts thereof in substantially the same positions;

Figure 3 is a top plan of the machine with its parts in substantially the same relative positions as illustrated in Figures 1 and 2;

Figure 4 is a vertical section through the forward end of the machine illustrating the parts in approximate relative positions for nail heading;

Figure 5 is an enlarged horizontal section through the forward end of the machine illustrating the parts in approximate relative positions for nail cut-off;

Figure 5A is a side elevation of the end of the cut-off and pointing die;

Figure 5B is an end elevation of the same;

Figure 6 is a diagrammatic view showing the approximate relative positions of the principal parts in a nail cut-off position;

Figure 7 is a similar view showing the parts in approximate relative positions for nail heading;

Figure 8 is a similar view showing parts in the approximate relative positions at the beginning of the wire feed by the wire straightener; and Figure 9 is an enlarged horizontal section of a portion of the machine illustrating the wire gripper carried by the header.

Figure 1:
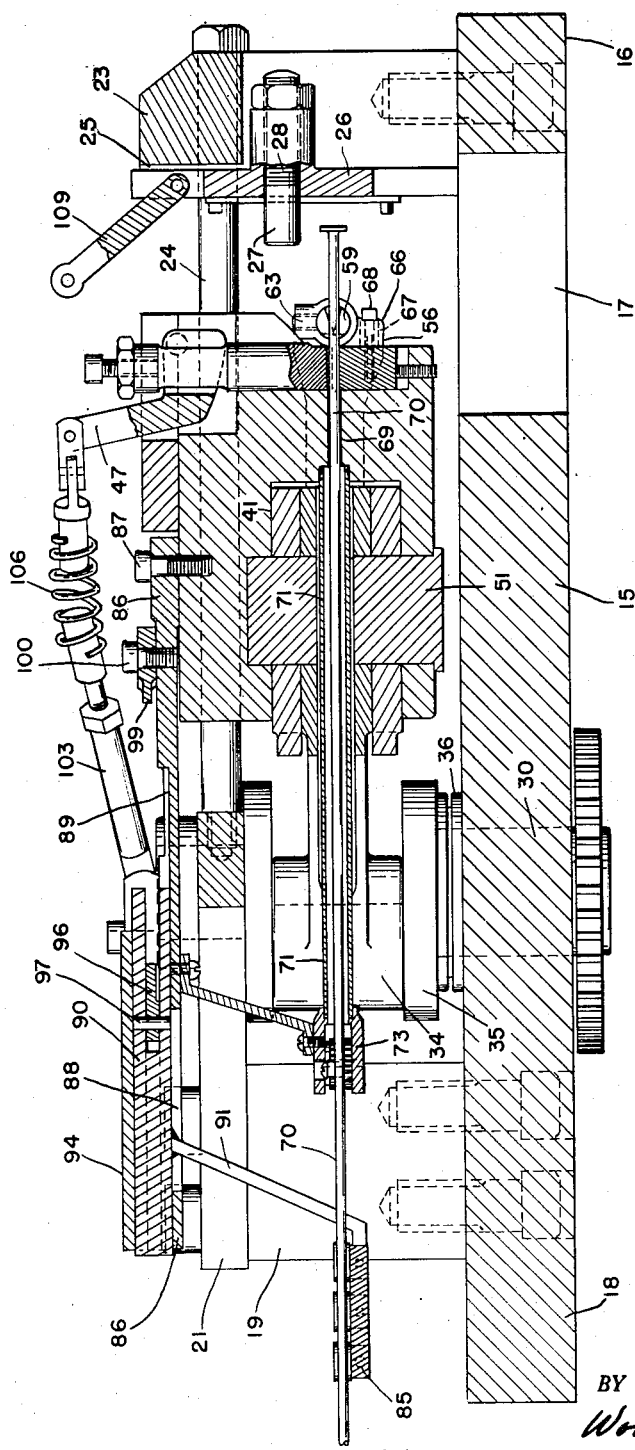
Figure 1 is a longitudinal vertical section taken through the machine and illustrating the parts thereof in approximate relative positions for cutting off a nail.

Briefly, the method of making nails with the herein disclosed apparatus consists of moving wire stock in a lengthwise direction and heading and cutting off the nail to length during forward motion of the wire. The feed of the wire for appropriate nail length is accomplished by the cooperative action of the combined wire straightener and wire feeder, and a wire gripper carried by a reciprocatory header, and this feed or advance of the wire occurs during partial retraction and advance of the header to keep the wire in motion for a time interval, which coupled with the wire advance caused by the forward movement of the header, keeps the wire in motion for a major portion of the entire cycle of operations. Nail cut-off jaws are carried by the header in order to cut nails during advances of the header with the wire, and means are provided to move the nail cutter out of the path of the header in order that the latter may upset the wire against an automatically movable anvil. This anvil has an active position to cooperate with the header in forming nail heads, and an inactive elevated position to clear the path for a nail length projected by the wire feeder. The anvil moves from an inactive elevated position to a lowered active position across the path of the formed nail to remove the latter from the wire in case there is a tendency for it to hang on after being cut off.

Referring now more particularly to the drawing wherein, for the purposes of illustration and not of limitation, is shown one of the preferred embodiments of the invention, the numeral 15 designates a horizontal bed for the machine, which, near its forward end 16, has a nail discharge opening 17. Near the rear end 18 of the bed, there is provided a pair of horizontally spaced vertical supporting blocks 19 to which are secured the arms 20 and 21 of a U-shaped horizontal support 22. The forward end 16 of the bed is provided with a vertical anvil support 23, and a pair of horizontally spaced stationary guide rods 24 are secured thereto to extend therefrom and are secured to the drive support 22. This anvil support 23 is provided with a vertical guideway 25, in which is slidably mounted an anvil carrying plate 26 carrying an anvil 27. This anvil is equipped with a threaded portion 28 for adjustable mounting in the carrying plate 26 whereby the anvil may be adjusted to fine degrees lengthwise of the bed 15. The anvil support 23 and guideway is provided with a vertical central slot 29 through which longer nails may be projected by the header when the anvil is in an elevated inactive position.

The novel power drive for the machine is composed essentially of a pair of vertical horizontally spaced and parallel drive shafts 30 and 31, which are journaled in the bed of the machine and in the support 22. These shafts are driven in opposite directions by intermeshing gears 32 or by any other suitable means. Such gears may be operated from a pulley or pulleys 33 keyed to one of the shafts driven by chains or pulleys from a suitable electric motor, or an electric motor may be employed to drive through a worm interposed between the two gears 32, or a suitable drive may be provided from an electric motor through a gear box to rotate one of the intergeared shafts at the desired speed.

Each drive shaft is provided with a crank or eccentric portion 34 having a pair of vertically spaced disks 35, the lower of which is supported upon a roller bearing 36, and the upper of which engages the undersurface of the supporting plate 22. The drive shaft 30 and its associated crank 34 is rotated in a counterclockwise direction while the shaft 31 and its associated crank 34' are driven in a clockwise direction. This crank 34' is arranged with respect to its shaft 31, 180 degrees from the position of the crank 34 relative to its shaft 30 whereby the cranks simultaneously arrive at their extreme inner and outer positions. This type of drive mechanism for the nail-making machine provides an extremely durable mechanism which requires little or no repair during long service.

Adapted to be reciprocated by the cranks of the two drive shafts, is a header 37 having an upper portion 38 slidably mounted upon the two guide rods 24 between the two supports 22 and 23. This header also has a lower portion 39, which is joined to the upper portion 38 by a vertical forward portion 40 to provide the header with a horizontal opening or slot 41' for a purpose which will presently appear. The vertical forward portion 40 of the header is provided in its forward face with a circular vertical opening 41 opening into this face for the reception of a pair of nail heading dies 42 and 43. Thus, the heading dies are exposed through the forward face 40. The relatively fixed lower heading die 42 is vertically adjustable in this opening by means of a screw 44. The upper heading die 43 has a wire barb forming groove in its inner end which is complementary to a similar groove in the top of die section 42, so that when this upper die is in its lowermost position, it will clamp the wire stock against the lower die 42 during the nail heading and cut-off operations and provide the nail with grooves or barbs under the head. The upper portion of the upper heading die is provided with a reduced portion straddled by a cam 45 operated to automatically raise and lower the upper die at timed intervals. This cam 45 is fulcrumed on the header as at 46 and is provided with an operating lever 47. It will be noted that the cam 45 is provided with a lower cam surface which holds the upper heading die clamped against the wire stock, and also has an upper cam portion which is employed to raise the heading die to release the wire at intervals during the operation of the machine. An adjustable screw 48 extends into the upper heading die 43 to form an adjustable abutment for the upper cam portion of cam 45. Thus, it will be apparent that the heading dies, besides forming a hammer surface for heading the nail, also form means for periodically clamping the wire in the header.

Forming a drive connection between the drive shafts 30 and 31 and the header 37 to reciprocate the latter, are a pair of levers or jaws 49 and 50 fulcrumed on a vertical axis by a fulcrum pin 51 in the horizontal slot 41' of the header 37. These jaws are not crossed at their fulcrum, but the jaw 49 is provided with a horizontal slot 52 to receive the fulcrum portion 53 of the other jaw for compactness of structure.

As best seen in Figure 5, the forward working ends 54 of these jaws are curved about the vertical portion 40 of the header; and each is provided with a forward face perpendicular to the bed and has a vertical groove 55 for the reception of a vertical guide rib 56 of a cut-off die holder 57. Each die holder is provided with a horizontal socket 58 for the reception of a cut-off die 59 which, as best seen in Figures 5, 5A and 5B, is provided with rearwardly converging cutting edges 60 which converge to the center of a vertical cutting edge 61. It will be obvious that the edges 60 will cut through the wire to provide the pointed end of a nail, while the cutting edge 60 tapers the end of the wire stock from which the nail is cut ready for a subsequent upsetting of said end. The cooperative action of the two cut-off dies 58 is illustrated in Figure 5, where the nail is shown being severed and is designated by the numeral 62. Each cut-off die is held in its holder by a screw 63 backed up by a screw 64 and which is prevented from accidental rotation by a screw 65 extending through the holder. Each holder is also provided with upper and lower lobes or ears 66, which are slotted, as at 67, for the reception of screws 68 entering the forward face of its respective jaw to hold the tool holder in its proper vertical position with respect to the jaw in order to operate in the exact horizontal plane of the wire stock. As the working ends of the two jaws move outwardly, the forward end of the header and the heading dies are exposed, whereby heading of the nail may subsequently take place against the lowered anvil 27.

The forward vertical portion of the header is provided with a horizontal wire feed opening 69 in alignment with the inner grooved ends of the heading dies 42 and 43 for the reception of the forward end of the wire stock 70. In axial alignment with this opening 69 is a wire feed tube 71 fastened to the header and extending longitudinally of the machine through the fulcrum pin 51 of the jaws to a point medially between the two arms 20 and 21 of the support 22, as best seen in Figures 1 to 3 inclusive. Thus, the feed tube 71 moves as a unit with the header.

In order that the wire stock will be prevented from being pulled back through the header during wire straightening, the rear end of the feed tube 71 is provided with an automatically operable wire gripper 72, which comprises a housing 73 in which is pivoted, as at 74, two intergeared segments 75. Housing 73 is connected to the header to move therewith by means of the bracket attachment 72'. Each of these segments has adjustably mounted thereon a gripper jaw 77 by means of a screw 76. These gripper jaws 77 are provided with complementary cam surfaces 78 and are adapted to swing rearwardly and engage opposite sides of the wire stock to grip the same upon forward movement of the header and during retractile movement of the wire straightener feed 85, and which swing forwardly of the machine as the header retracts to release their grip upon the wire and slide freely thereover, to permit the wire straightener feed to feed the wire through the gripper to nail length. One of these geared segments is provided with a laterally extending contact finger 79, which is utilized to manually swing the gripper jaws 77 forwardly to release their grip on the wire when it is desired to stop the feed of the wire with the header. To actuate the gripper finger 79 for this purpose, a manually operated presser 80 having an elongated finger contact surface 81 is carried by a shaft 82 slidably mounted in the arm 21 of the drive support. This shaft is provided with an annular groove 83 to cooperate with a spring pressed ball detent 84 carried in the arm 21 so as to hold the contact surface 81 in the path of movement of the finger 79 during its reciprocations with the header, thereby causing the gripper jaws 77 to be held spaced from the wire stock to ride free thereof.

To form a mounting for a combined wire straightener and wire feeder 85, the header 37 has an elongated rearwardly extending tail plate 86 fastened rigidly thereto by a screw 87 or other suitable means. This tail plate extends rearwardly of the machine above the support 22 to a point between the arms 20 and 21 thereof and is provided with an elongated slot 88 extending lengthwise thereof, as best seen in Figure 1. The upper face of this tail plate is provided with a groove 89 extending lengthwise of the plate and in which is slidably mounted a reciprocatory bar 90, to the under side of which, above the slot 88, is secured a depending arm 91 connected with the forward end of the wire straightener 85. In this straightener is mounted a series of wire engaging grooved rollers 92 arranged in pairs, which are independently adjustable by the screws 93 to preferably slightly stagger the pairs of wire straightening rollers in order that they may grip the wire stock 70, to advance it through the wire feed tube 71 and header 37. The bar 90 is slidably retained in the groove 89 of the tail plate by a cover plate 94 secured to the tail plate by screws 95.

The bar 90 and wire straightener are reciprocated as a unit at properly timed intervals by an arm 96 of a toggle mechanism. This arm is pivotally connected to the bar 90 while the opposite end of this toggle arm 96 is connected to an operating link 97 by a pivot 98. The other arm 99 of the toggle is pivotally connected by the pin 98 to the tail plate of the header by a pin 100, thus forming an elbow for the toggle mechanism. The actuating link 97 of the toggle is adjustable in length for varying nail length and is connected eccentrically, as at 101, to a disk 102 mounted on the upper end of the drive shaft 30. From Figures 6 to 9 inclusive, it will be noted that this eccentric 101 leads the crank or eccentric 34 of the shaft 30 in a counterclockwise direction to operate the toggle mechanism and wire feed at timed intervals. If desired, the eccentric connection 101 can be adjusted to different positions around the disk 102 to alter the timing and relative movements of the header and wire straightener.

The wire clamping cam 45 at the forward end of the header is automatically operated at timed intervals by a yieldable rod 103 connecting the cam lever 47 with a eccentric 104 carried by a disk 105, which is secured concentrically to the upper end of the other drive shaft 31. This yieldable rod 103 is composed of two sections connected by a compression coil spring 106, in order to compensate for difference in relative travel of the crank and eccentric 104 and to yield at both extremes of maximum clamping action by the screw 45. If desired, however, this may be a rigid one-piece rod made adjustable in length by a turn-buckle connection 107. The eccentric connection 104 may be adjustable to different points around the periphery of the disk 105 to attain any desired timing of the operation of the wire clamp mechanism. From Figures 6 to 9 inclusive, it will be noted that this eccentric 104 follows the crank portion 34' of drive shaft 31 in a clockwise direction in order that the wire clamping mechanism will be operated to release its grip upon the wire as the eccentric 104 passes a point to the right of the common center line of the drive shafts 30 and 31.

To raise and lower the anvil 27 at properly timed intervals, the forward end of the header is provided with a horn 108, the free end of which overhangs the forward end of the header and is pivotally connected by a link 109 to the upper end of the anvil slide 26. Consequently, as the header advances forwardly toward the anvil support 23, the link 109 will cause the anvil 27 to lower toward its active position in alignment with the wire held in the header, and in descending to this position, will dislodge any complete nail which tends to hang on the wire stock after being cut off. Conversely, as the header retracts from the anvil support, the link 109 will cause elevation of the anvil to its inactive position shown in Figure 2, allowing for projection of the nail length through the anvil support 23 during the wire feeding to nail length.

An operating cycle of the machine will be described starting from the nail cut-off stage, shown diagrammatically in Figure 6, where it will be observed that the cranks 34 and 34' for the cut-off jaws 49 and 50 are positioned at their widest distance apart causing their cut-off dies 59 to reach their innermost positions to point and cut the nail from the wire stock far enough ahead of the head forming dies 42 and 43 to leave enough wire to form a head on the forward end of the wire stock. At this time, the wire will start to be clamped in the header by the clamping cam 45 during the cutoff. It is recalled that the cranks rotate in opposite directions at the same rate; and as they move forwardly and approach, the header advances towards the descending anvil, and the working ends 54 of the cut-off jaws being opening. The descending anvil 27 will strike the formed nail and knock it out of the way. As the header advances, its wire gripper 72 grips the wire and causes it to move in unison with the header. At the same time, the elbow 98 of the feed toggle is being straightened by being moved inwardly toward the longitudinal center of the machine to move the wire straightener feed 85 rearwardly on the wire ready to grip the wire and advance it when the elbow again bends after the nail heading operations.

As the jaw cranks 34 and 34' reach their forwardmost positions, as in Figure 7, the anvil has already reached its lowermost active position in the path of the wire being advanced by the header to head the wire. At this time, the cut-off jaws and dies 59 have reached an open position allowing the heading dies of the header to cooperate therebetween with the anvil. The wire is held clamped in the header by the cam 45 during the heading operation and until the header has slightly retracted, at which time the clamp is releaed by the clamp eccentric 104 moving rearwardly.

As the header starts to retract, with the clamp 45 still clamped and gripper jaws 77 open and sliding rearwardly free of the wire, the cut-off jaws 54 open wide as the feed toggle elbow 98 straightens to move the straightener 85 rearwardly on the wire to straighten it. During header retraction, the clamping die 45 is opened and the toggle elbow 98 is again bent to advance the wire feed straightener 85, which grips the wire and advances it the length of the nail which is being formed. During this time, the anvil has been elevated to its inactive position out of the way of the headed wire length which is being moved forward by the straightener, as shown in Figure 2. Since the clamp operating eccentric 104 follows its associated crank around clockwise, the clamping cam 45 does not start to clamp the wire again until the wire feed which is effected by the straightener 85 has been completed. The eccentric operator 101 for the wire feed leads its associated crank 34' around counterclockwise, and therefore the header continues retraction until it is fully retracted and the wire feed by the straightener begins, as indicated in Figure 8. The wire clamp cam 45 does not again begin to be operated to clamp the wire in the header until the clamp eccentric 104 moves clockwise away from the common center line of the drive shafts 30 and 31. The cam 45 then remains in clamping position until the eccentric 104 begins to move rearwardly of the machine to retract the rod 103. As the cranks 34 and 34' again reach their outermost positions, as shown in Figure 6, the cut-off dies 59 close on the wire as the wire is clamped and being moved forward with the header. This completes an operating cycle of the machine to form a nail; each cycle occuring in approximately less than a second of time, and the cycles are repeated continuously to give the machine increased continuous productivity.

From the foregoing, it will be observed that the wire stock is locked in the header 37 by the clamping and heading dies 42 and 43 and by the gripper 72 during advance of the header, whereby the stock is in motion constantly while a nail is in the process of being made. The stock itself is in motion with the header, locking dies and gripper as it strikes the anvil 27 to head the nail. After nail heading, the anvil raises and the stock is fed to nail length under the anvil by the stock straightener and feeder 85. During a portion of the advance stroke of the header, the wire straightener feed 85 moves rearwardly along the stock while it is held in the header by the clamping dies and gripper so that the stock is not pulled back rearwardly relative to the header. When the stock is headed against the anvil with the header holding it locked in motion and it is ready to retract, the wire straightener feed 85 still retracting for a short distance with the header to allow the clamping dies to open; and as the header continues to retract and the gripper opens, the wire straightener feed advances the stock through the header for the length of the nail desired. This wire straightener feed 85 advances for the length of nail desired as the anvil is in elevated position and it stops feeding of the stock and begins to retract when the header begins to advance.

When the header starts to advance with the gripper 72, the wire straightener feed stops feeding the stock so that the latter will travel forward at the same speed with the header to allow the clamping and heading dies 42 and 43 to lock upon the stock without interference. As the header continues to advance, the cut-off dies 50 operate to cut off the nail length while they are advancing with the header and stock. As the header continues forward with the stock locked therein, these cut-off dies separate and the anvil descends and knocks the nail off and at the same time the anvil slows down to a slow motion as the header approaches it with the stock locked in the header to form the next nail. It will be obvious that a nail is completed during each direct advance motion of the header. This, of course, obviously contributes to the increased speed of production by the machine.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. The method of making nails consisting of the steps of clamping wire while moving it in a lengthwise direction and cutting off a nail length, and continuing said clamping and movement of the wire in the same lengthwise direction against an abutment to head the cut-off end of the wire, and thereafter releasing the clamping of the headed wire and feeding said wire to nail length ready for another cutting off.

2. In a nail-making machine, the combination of a retractible anvil, a reciprocable header, a wire clamp carried thereby and adapted to grip the wire and advance it toward said anvil upon advance of said header, cut-off means carried by said header and adapted to cut off headed wire to nail length upon advance of said header toward said anvil, mechanism to advance and retract said header and to operate said clamp and cut-off means during advance of said header toward said anvil, a wire feeding wire straightener operable by said mechanism to advance and retract said header to advance said wire feeding straightener toward said anvil to feed wire toward the anvil upon retraction of said header, and means for retracting said anvil.

3. In a nail-making machine, the combination of a retractible anvil, a reciprocable header having mechanism to advance said header toward said anvil to head wire and to retract said header, a wire gripper carried by said header to grip wire to advance it with said header upon advance of said header, cut-off mechanism operating to cut the wire to nail length after heading and upon advance of said header toward said anvil, and a wire feeding straightener mechanism operable to advance wire to nail length after heading and prior to said cutting, and common drive means for sequentially operating said header, said wire gripper, said cut-off mechanism, said wire feeding straightener mechanism and for retracting said anvil.

4. In a nail-making machine, the combination of an anvil movable into and out of heading position, a reciprocable header adapted to advance and retract from said anvil and having a forward end to cooperate with said anvil to head wire upon advance of said header, a pair of cut-off jaws carried by said header and having working ends movable across said end to cut a nail to length and retractible to expose said end to said anvil, a pair of oppositely rotatable shafts connected to said jaws to operate the same and to reciprocate said header, wire feeder means carried by said header to grip wire to advance it toward said anvil in accordance to the movement of said header, wire clamping means carried by said header and operated by an eccentric of one of said shafts to clamp the wire in said header during heading and cut-off of the nail, and said wire feeding means being operated from an eccentric of the other shaft to advance the wire relative to said header when said anvil is moved out of heading position.

5. In a nail-making machine, the combination of an anvil movable into and out of heading position, a reciprocable header adapted to advance and retract from said anvil and having a forward end to cooperate with said anvil to head wire upon advance of said header, a pair of cut-off jaws carried by said header and having working ends movable across said end to cut a nail to length and retractible to expose said end to said anvil, a pair of oppositely rotatable shafts connected to said jaws to operate the same and to reciprocate said header, wire feeder means carried by said header to grip wire to advance it toward said anvil in accordance to the movement of said header, wire clamping means carried by said header and operated by an eccentric of one of said shafts to clamp the wire in said header during heading and cut-off of the nail, and said wire feeding means being operated from an eccentric of the other shaft to advance the wire relative to said header when said anvil is moved out of heading position, wherein said wire feeding means includes a toggle linkage connected with said header.

6. In a nail-making machine, the combination of an anvil movable into and out of heading position, a reciprocable header adapted to advance and retract from said anvil, relatively movable heading and clamping dies carried by the forward end of said header and adapted to clamp and head the wire against said anvil upon advance of said header, relatively movable cut-off dies carried by said header movable in front of said heading dies to cut a nail to length upon advance of said header and said cut-off dies being retractible after cutting to expose said heading dies to said anvil, a pair of shafts rotatable in opposite directions and connected to said header to advance and retract the same, wire feeding means to feed the wire to nail length after heading when said anvil is moved out of heading position, an eccentric operated by one of said shafts to relatively move said heading and clamping dies, and a second eccentric operated by said other shaft to operate said wire feeding means.

7. In a nail-making machine, the combination of an anvil movable into and out of heading position, a reciprocable header movable to said anvil and carrying wire stock therewith to upset said stock against said anvil to form a nail head, eccentric mechanism to reciprocate said header, wire feed mechanism operated by an eccentric mechanism to thereafter feed the wire stock to nail length forwardly relative to said header when said anvil is moved out of heading position, wire stock clamping mechanism carried by said header and operated by an eccentric mechanism to clamp the wire stock in said header during nail heading, and wire stock cut-off mechanism operable by movement of said header toward said anvil after said wire stock feeding of nail length to cut off said nail length while being moved by said header toward said anvil.

8. In a nail making machine, the combination of an anvil movable into and out of the path of movement of stock to be formed into nails, a reciprocable header mechanism for advancing and retracting said header to and from said anvil, a stock gripper movable with said header and adapted to grip wire stock upon advance of said header and to move said stock toward said anvil with the header to head said stock, said stock gripper being constructed to release its grip on said stock upon retraction of said header, stock clamping mechanism operated by said header mechanism to clamp said stock relative to said header upon advance of said header to head said stock against said anvil and to thereafter release said stock, stock feeding mechanism operated by said header mechanism to feed said stock to nail length after said nail heading operation and upon release of said clamping mechanism and gripper, and stock cutting mechanism carried by said header and operated upon advance of said header to cut off said nail length after stock feeding by said wire feeding mechanism.

9. The method of making nails consisting of the steps of heading nail stock by holding and moving it in a linear direction, feeding it to nail length in said direction and cutting it to nail length all of which stops take place while the stock is in motion in said linear direction.

10. The method of making nails consisting of the steps of clamping and moving stock along a path in a lengthwise direction while cutting off a nail length, continuing said clamping and movement of the stock in the same lengthwise direction against an abutment to head the cut-off end of the stock, removing said abutment from said path, and releasing the clamping of said headed stock and feeding it to nail length ready for another cutting off.

11. In a nail making machine for making nails of various lengths, a nail header reciprocable to move nail stock in a given path to the same extent to make nails of various lengths, a stock clamp mounted by said header, a stock feeder mounted by said header and operable upon retraction of said header to feed stock along said path, an anvil movable into the path of stock carried by said header to cooperate in heading the stock and movable out of said path to clear it for the feed of said headed stock along said path by said feeder, and said feeder being adjustable to vary the nail length of stock fed thereby, and means for reciprocating said header.

12. A nail making machine as recited in claim 11 wherein said movable anvil is connected with said header by linkage to be operated thereby.

13. In a nail making machine for making nails of various lengths, a nail header reciprocable to move nail stock in a given path to the same extent to make nails of various lengths, a stock clamp mounted by said header, a stock feeder mounted by said header and operable upon retraction of said header to feed stock along said path, a stock cut-off mounted by said header to cut said headed stock to nail length, an anvil movable into the path of stock carried by said header to knock off said nail length and to cooperate in heading the stock, said anvil being movable out of said path to clear it for the feed of headed stock along said path by said feeder, and said feeder being adjustable to vary the nail length of stock fed thereby, and means for reciprocating said header.

14. In a nail making machine, a reciprocable header having mechanism to move said header in a path in a lengthwise direction, an anvil having mechanism to move said anvil into and out of said path, said header having relatively movable heading and clamping dies operated to clamp stock in said header to move in unison therewith in said path against said anvil to head the stock, and a stock feeder having mechanism to advance headed stock lengthwise relative to said path and header to nail length while said header retracts and said heading and clamping dies release their grip upon the stock when said anvil moves out of said path.

15. In a nail making machine, an anvil, a nail header reciprocable to move stock in a given path toward and from said anvil, said anvil being movable into and out of said path, drive mechanism for reciprocating said header, a stock clamp mounted by said header and operated by said drive mechanism to grip and move stock along said path in unison with said header and against said anvil to head the stock and to thereafter release its grip on said stock, and a stock feeder mounted by said header and operated by said drive mechanism to move said headed stock lengthwise relative to said path and header to nail length as said header moves away from said anvil and said clamp releases its grip on said stock and when said anvil moves out of said path.

16. In a nail making machine, an anvil, a nail header reciprocable to move stock in a given path toward and from said anvil, said anvil being movable into and out of said path, drive mechanism for reciprocating said header, a stock clamp mounted by said header and operated by said drive mechanism to grip and move stock along said path in unison with said header and against said anvil to head the stock and to thereafter release its grip on said stock, a stock feeder mounted by said header and operated by said drive mechanism to move said headed stock lengthwise relative to said path and header to nail length as said header moves away from said anvil and said clamp releases its grip on said stock and when said anvil moves out of said path, and a stock cut off mounted by said header and operated by said drive mechanism to move transversely of said path to cut off the headed stock to nail length while said clamp grips the stock and the header advances toward said anvil, said stock cut off thereafter being moved from said path as said anvil enters said path and said header moves said stock toward said anvil.

17. In a nail making machine, an anvil, a nail header reciprocable to move stock in a given path toward and from said anvil, said anvil being movable into and out of said path, drive mechanism for reciprocating said header, a stock clamp operated by said drive mechanism and mounted by said header and operable to grip and move stock along said path in unison with said header and against said anvil to head the stock and to thereafter release its grip on the stock whereby said stock can be moved along said path toward said anvil to nail length relative of said header, a stock straightener and feeder operated by said drive mechanism and mounted by said header and movable relative thereto to feed headed stock to nail length along said path relative to said header during movement of said header away from said anvil when said clamp releases its grip on said stock, and a stock gripper mounted by said header and constructed to allow stock movement by said feeder relative to said header toward said anvil and to prevent stock movement relative to said header away from said anvil and adapted to grip stock as said header moves toward said anvil to head the stock and as said straightener and feeder moves back along said stock to straighten the same as said gripper holds said stock in said header from being pulled back in a direction away from said anvil, said gripper thereafter releasing its grip upon said stock as said feeder feeds the stock to nail length relative to said header, clamp and gripper, and thereafter said gripper being operable to grip said stock after said stock straightener and feeder feeds the stock to nail length.

18. In a nail making machine, an anvil, a nail header reciprocable to move stock in a given path toward and from said anvil, said anvil being movable into and out of said path, drive mechanism for reciprocating said header, a stock clamp operated by said drive mechanism and mounted by said header and operable to grip and move stock along said path in unison with said header and against said anvil to head the stock and to thereafter release its grip on the stock whereby said stock can be moved along said path toward said anvil to nail length relative of said header, a stock straightener and feeder operated by said drive mechanism and mounted by said header and movable relative thereto to feed headed stock to nail length along said path relative to said header during movement of said header away from said anvil when said clamp releases its grip on said stock, nail cut off means mounted by said header and operated by said drive mechanism to cut headed stock to nail length as said header moves said stock toward said anvil, a stock gripper mounted by said header and constructed to allow stock movement by said feeder relative to said header toward said anvil and to prevent stock movement relative to said header away from said anvil and adapted to grip stock as said header moves toward said anvil to head the stock and as said straightener and feeder moves back along said stock to straighten the same as said gripper holds said stock in said header from being pulled back in a direction away from said anvil, said gripper thereafter releasing its grip upon said stock as said feeder feeds the stock to nail length relative to said header, said cut-off means, said clamp and said gripper, and thereafter said gripper being operable to grip said stock after said stock straightener and feeder feeds the stock to nail length.

19. The method of making a headed article from a continuous length of stock comprising the steps of clamping and moving said stock along a path in a length wise direction while cutting off a predetermined length of said stock, continuing said clamping and movement of said stock in said same lengthwise direction against an abutment to head the cut-off end of said stock, removing said abutment from said path, and releasing the clamping of said headed stock and feeding it to said predetermined length ready for another cutting off.

References Cited in the file of this patent

UNITED STATES PATENTS

| | | |
|---|---|---|
| 382,632 | Bancroft | May 8, 1888 |
| 1,132,626 | Seybold | Mar. 23, 1915 |
| 1,500,600 | Biggert | July 8, 1924 |
| 2,216,049 | Rice | Sept. 24, 1940 |

FOREIGN PATENTS

| | | |
|---|---|---|
| 138,086 | Australia | July 25, 1950 |